United States Patent [19]

Inoue et al.

[11] Patent Number: 5,316,099

[45] Date of Patent: May 31, 1994

[54] FOUR-WHEEL STEERING SYSTEM FOR AUTOMOTIVE VEHICLE

[75] Inventors: Hideo Inoue, Kanagawa; Osamu Takeda, Susono, both of Japan

[73] Assignee: Toyota Jidosha Kabushiki Kaisha, Toyota, Japan

[21] Appl. No.: 898,176

[22] Filed: Jun. 12, 1992

Related U.S. Application Data

[63] Continuation of Ser. No. 577,654, Sep. 4, 1990, abandoned.

[30] Foreign Application Priority Data

Sep. 4, 1989 [JP] Japan .................................. 1-228706

[51] Int. Cl.⁵ ............................................ B62D 5/06
[52] U.S. Cl. .................................. 180/140; 180/141; 364/426.02
[58] Field of Search .............. 180/140, 142, 143, 141, 180/236; 280/91; 364/426.02, 424.05

[56] References Cited

U.S. PATENT DOCUMENTS

| | | | |
|---|---|---|---|
| 4,719,981 | 1/1988 | Miyoshi | 180/140 |
| 4,840,389 | 6/1989 | Kawabe et al. | 180/140 |
| 4,926,954 | 5/1990 | Ataka et al. | 180/140 |
| 4,926,955 | 5/1990 | Ohmura et al. | 180/140 |
| 4,941,095 | 7/1990 | Imaseki et al. | 364/424.05 |
| 4,967,865 | 11/1990 | Schindler | 180/140 |
| 4,976,328 | 12/1990 | Ohmura | 180/140 |
| 5,054,568 | 10/1991 | Shiraishi et al. | 280/91 |

FOREIGN PATENT DOCUMENTS

3300640 2/1990 Fed. Rep. of Germany .
63-207772 8/1988 Japan .

*Primary Examiner*—Richard M. Camby
*Assistant Examiner*—Ann Boehler
*Attorney, Agent, or Firm*—Cushman, Darby & Cushman

[57] ABSTRACT

In a four-wheel steering system for an automotive vehicle, a travel speed of the vehicle is detected to determine parameter related to the detected vehicle speed, and lateral deviation of the vehicle is further detected to determine a steering angle of rear road wheels on a basis of the detected lateral deviation of the vehicle and the determined parameter. When the detected vehicle speed becomes unreliable due to skid condition of either one of the road wheels, the steering angle of the rear road wheels is determined on a basis of the detected lateral deviation and the fixed parameter.

6 Claims, 4 Drawing Sheets

FOUR-WHEEL STEERING SYSTEM FOR AUTOMOTIVE VEHICLE

This is a continuation of U.S. application Ser. No. 07/577,654, filed on Sep. 4, 1990, now abandoned.

BACKGROUND OF THE INVENTION

1. Field of the Invention

The present invention relates to a four-wheel steering system for an automotive vehicle, and more particularly to a four-wheel steering system in which lateral deviation of the vehicle is detected by detection of a front wheel steering angle and a yawrate or detection of lateral acceleration for determination of a desired steering angle of rear road wheels.

2. Discussion of the Prior Art

Disclosed in Japanese Patent Laid-open Publication 63-207772 is a four-wheel steering system wherein a front wheel steering angle, a yawrate and a vehicle speed are detected to determine a desired steering angle of rear road wheels on a basis of a coefficient related to the vehicle speed and the front wheel steering angle and yawrate. The vehicle speed, however, may not be properly detected when the road wheels tend to be locked in braking operation. If the coefficient is determined by improper detection of the vehicle speed, the rear road wheels will be steered at an unwanted angle.

SUMMARY OF THE INVENTION

It is, therefore, a primary object of the present invention to provide an improved four-wheel steering system wherein a desired steering angle of rear road wheels can be properly determined by using predetermined parameter when the vehicle speed may not be properly detected.

According to the present invention, the primary object is attained by providing a four-wheel steering system having a front wheel steering mechanism operable in response to a steering effort applied thereto to steer a set of dirigible front road wheels, a rear wheel steering mechanism arranged to steer a set of dirigible rear road wheels, and an electric control apparatus including a speed sensor for detecting a travel speed of the vehicle, means for detecting lateral deviation of the vehicle, means for determining parameter related to the detected vehicle speed, means for determining a steering angle of the rear road wheels on a basis of the detected lateral deviation of the vehicle and the determined parameter, and means for causing the rear wheel steering mechanism to steer the rear road wheels at the determined steering angle. The electric control apparatus further comprises means for determining whether the speed sensor is in a normal condition and means for a difference between the vehicle speeds detected by the speed sensor at a beginning and end of a predetermined time interval is extraordinarily large and for determining a steering angle of the rear road wheels on a basis of the detected lateral deviation of the vehicle and the fixed parameter.

BRIEF DESCRIPTION OF THE DRAWINGS

Other objects, features and advantages of of the present invention will become more readily apparent from the following detailed description of a preferred embodiment thereof when taken together with the accompanying drawings, in which.

DESCRIPTION OF THE PREFERRED EMBODIMENT

Figure 1:
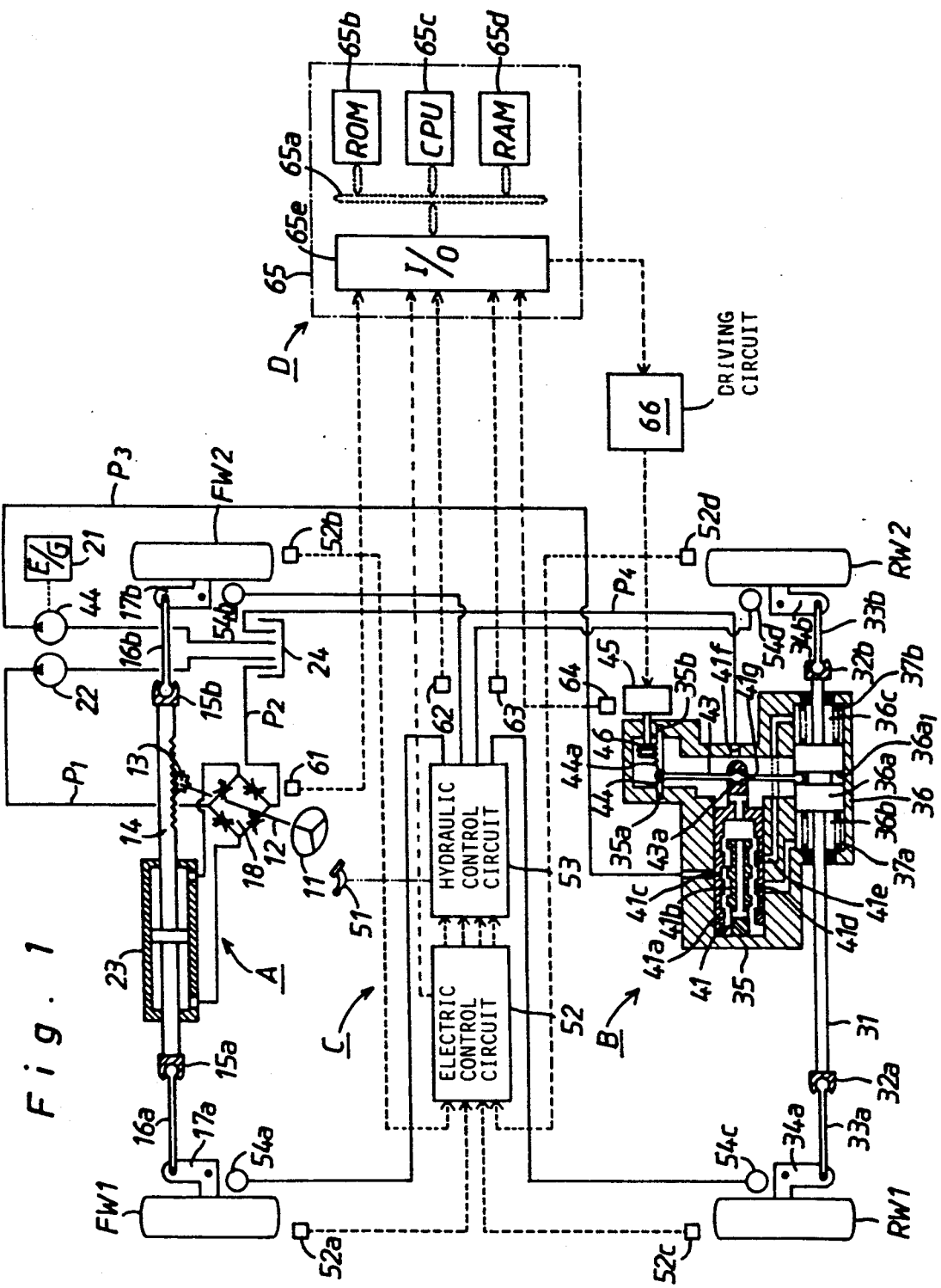
FIG. 1 is a schematic plan view of an automotive vehicle equipped with a four-wheel steering system in accordance with the present invention.

In FIG. 1 of the drawings, there is schematically illustrated an automotive vehicle equipped with a four-wheel steering system which comprises a front wheel steering mechanism A arranged to steer a pair of dirigible front road wheels FW1, FW2, a rear wheel steering mechanism B arranged to steer a pair of dirigible rear road wheels RW1, RW2 in response to steerage of the front road wheels FW1, FW2, an anti-skid apparatus C provided to prevent the road wheels from locking in braking operation, and an electric control apparatus D for the rear wheel steering mechanism B.

The front wheel steering mechanism A is in the form of a well-known power-assisted steering mechanism which includes a lateral rack bar 14 arranged to be axially displaced by operation of a steering wheel 11, a pair of tie rods 16a, 16b each connected to opposite ends of the rack bar 14 by means of a pair of rack ends 15a, 15b, and a pair of knuckle arms 17a, 17b each connected to the tie rods 16a, 16b to steer the front road wheels FW1, FW2 in response to axial displacement of the rack bar 14. The rack bar 14 is operatively connected to the steering wheel 11 through a pinion gear 13 and a steering shaft assembly 12. The steering shaft assembly 12 is provided thereon with a control valve 18 in the form of a four-way valve which is responsive to the driver's steering effort applied thereto from the steering wheel 11 to control the flow of hydraulic fluid under pressure supplied into a hydraulic power cylinder 23 from a hydraulic pump 22 through a conduit $P_1$ and to control the flow of hydraulic fluid discharged from the power cylinder 23 into a fluid reservoir 24 through a conduit $P_2$. The hydraulic pump 22 is driven by a prime mover 21 of the vehicle, and the power cylinder 23 is activated under control of the hydraulic fluid to cause axial displacement of the rack bar 14 to assist steerage of the front road wheels FW1, FW2.

The rear wheel steering mechanism B includes a lateral rod 31 arranged to be axially displaced, a pair of tie rods 33a, 33b each connected to opposite ends of lateral rod 31 by means of a pair of rack ends 32a, 32b, a pair of knuckle arms 34a, 34b each connected to the tie rods 33a, 33b to steer the rear road wheels RW1, RW2 in response to axial displacement of the lateral rod 31. The lateral rod 31 is axially slidably carried on a housing 35 which is fixedly mounted on a body structure of the vehicle. The housing 35 is formed to contain therein a hydraulic power cylinder 36 for effecting axial displacement of the lateral rod 31. The power cylinder 36 includes a power piston 36a axially slidably disposed within the housing 35 to form a pair of fluid chambers 36b and 36c and a pair of opposed coil springs 37a, 37b assembled in surrounding relationship with the lateral rod 31 and being applied with a preload for retaining the lateral rod 31 in its neutral position. The power piston 36a is fixed to the lateral rod 31 to effect axial displacement of the lateral rod 31 in accordance with hydraulic fluid under pressure selectively supplied into the fluid chamber 36b or 36c.

The housing 35 is formed to further contain therein a spool valve assembly 41. The spool valve assembly 41 includes a valve sleeve 41a axially movably disposed within the housing 35 and a valve spool 41b fixed in place for relative movement with the valve sleeve 41a. When moved leftward, the valve sleeve 41a cooperates with the valve spool 41b to supply hydraulic fluid under pressure into the left chamber 36b of power cylinder 36 from a hydraulic pump 44 through a conduit $P_3$ and ports 41c, 41d and to permit the flow of hydraulic fluid discharged from the right chamber 36c of power cylinder 36 into the fluid reservoir 24 through ports 41e, 41f and a conduit $P_4$. When moved rightward, the valve sleeve 41a cooperates with the valve spool 41b to supply the hydraulic fluid under pressure into the right chamber 36c of power cylinder 36 from the pump 44 through ports 41c, 41e and to permit the flow of hydraulic fluid discharged from the left chamber 36b of power cylinder 36 into the fluid reservoir 24 through ports 41d, 41f.

The valve sleeve 41a is operatively connected at its right end to the lateral rod 31 and a rack pin 44 by means of a swingable lever 43. The swingable lever 43 has a pivot portion 43a formed with a spherical surface for engagement with a corresponding bore 41g in the right end of valve sleeve 41a. The swingable lever 43 is pivotally engaged at its one end with an annular groove $36a_1$ formed on the power piston 36a and is pivoted at its other end to the rack pin 44. The rack pin 44 is axially slidably supported at 35a, 35b on the housing 35 and is meshed at its toothed portion 44a with a worm gear 46 which is fixed to a rotary shaft of a reversible step-motor 45 for rotation therewith. When the step-motor 45 is activated to rotate in a forward direction, the rack pin 44 is displaced rightward. When the step-motor 45 is activated to rotate in a reverse direction, the rack pin 44 is displaced leftward.

Figure 5:
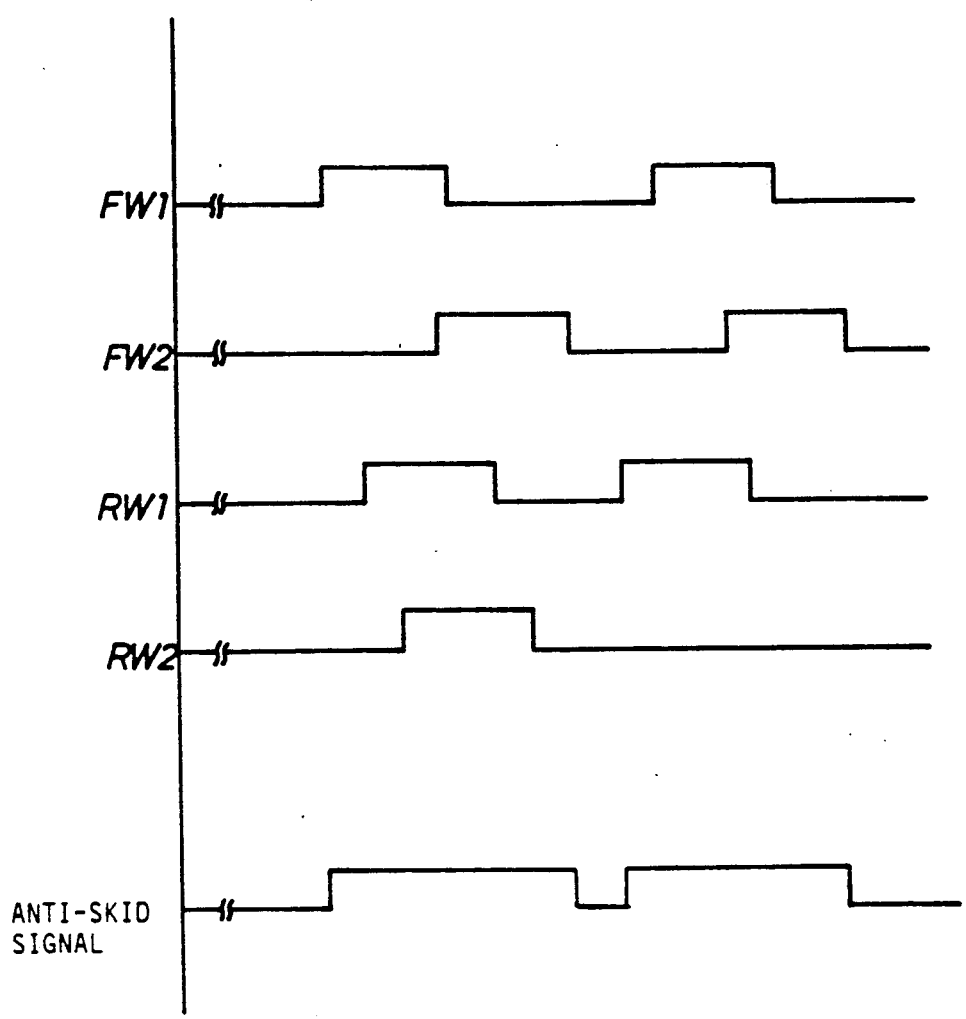
FIG. 5 is a time chart showing respective control signals for the wheel brake cylinders of the vehicle and an anti-skid signal.

The anti-skid apparatus C includes an electric control circuit 52 associated with an anti-skid hydraulic control circuit 53. The electric control circuit 52 comprises a microcomputer (not shown) connected to speed sensors 52a-52d which are arranged to detect each rotation speed of the road wheels FW1, FW2, RW1, RW2. The microcomputer is programmed to presume vehicle speeds VF1, VF2, VR1, VR2 at the road wheels based on each electric signal from speed sensors 52a-52d for detecting skid conditions of the road wheels FW1, FW2, RW1, RW2 and to produce electric control signals indicative of the skid conditions therefrom for controlling brake pressures applied to wheel brake cylinders 54a-54d. (see FIG. 5) The microcomputer is further programmed to produce an anti-skid signal indicative of the fact that either one of the brake pressures is being controlled to prevent either one of the road wheels from locking in braking operation. (see FIG. 5) The anti-skid hydraulic control circuit 53 comprises a plurality of electrically operated switchover valves disposed within each braking circuit connecting a master cylinder to the wheel brake cylinders 54a-54d to intermittently connect the wheel brake cylinders to a fluid reservoir of the master cylinder in response to the electric control signals applied thereto from the electric control circuit 52.

The electric control apparatus D for the rear wheel steering mechanism B is in the form of a microcomputer 65 which includes an input-output device or I/O 65e connected to a steering angle sensor 61, a vehicle speed sensor 62, a yawrate sensor 63 and a rotational angle sensor 64. The steering angle sensor 61 is arranged to detect a rotational angle of the steering shaft 12 or an axial displacement amount of the rack bar 14 thereby to produce an electric signal indicative of a steering angle $\delta f$ of the front road wheels FW1, FW2. The vehicle speed sensor 62 is arranged to detect a rotational speed of an output shaft of a power transmission thereby to produce an electric signal indicative of an actual vehicle speed V at the rear wheel drive system. The yawrate sensor 63 is arranged to detect a yawing speed of the vehicle body thereby to produce an electric signal indicative of a yawrate $\gamma$ of the vehicle. The rotational angle sensor 64 is arranged to detect a rotational angle $\theta$ of the rotary shaft of step-motor 45 thereby to produce an electric signal indicative of the rotational angle $\theta$. In control of the four-wheel steering system described later, the front wheel steering angle $\delta f$ is indicated as a positive value when the steering wheel 11 is turned rightward and as a negative value when the steering wheel 11 is turned leftward. The yawrate $\gamma$ is indicated as a positive value when the vehicle body is turned rightward and as a negative value when the vehicle body is turned leftward. The rotational angle $\theta$ is indicated as a positive value when the step-motor 45 is activated to rotate in the forward direction and as a negative value when the step-motor 45 is activated to rotate in the reverse direction.

Figure 2:
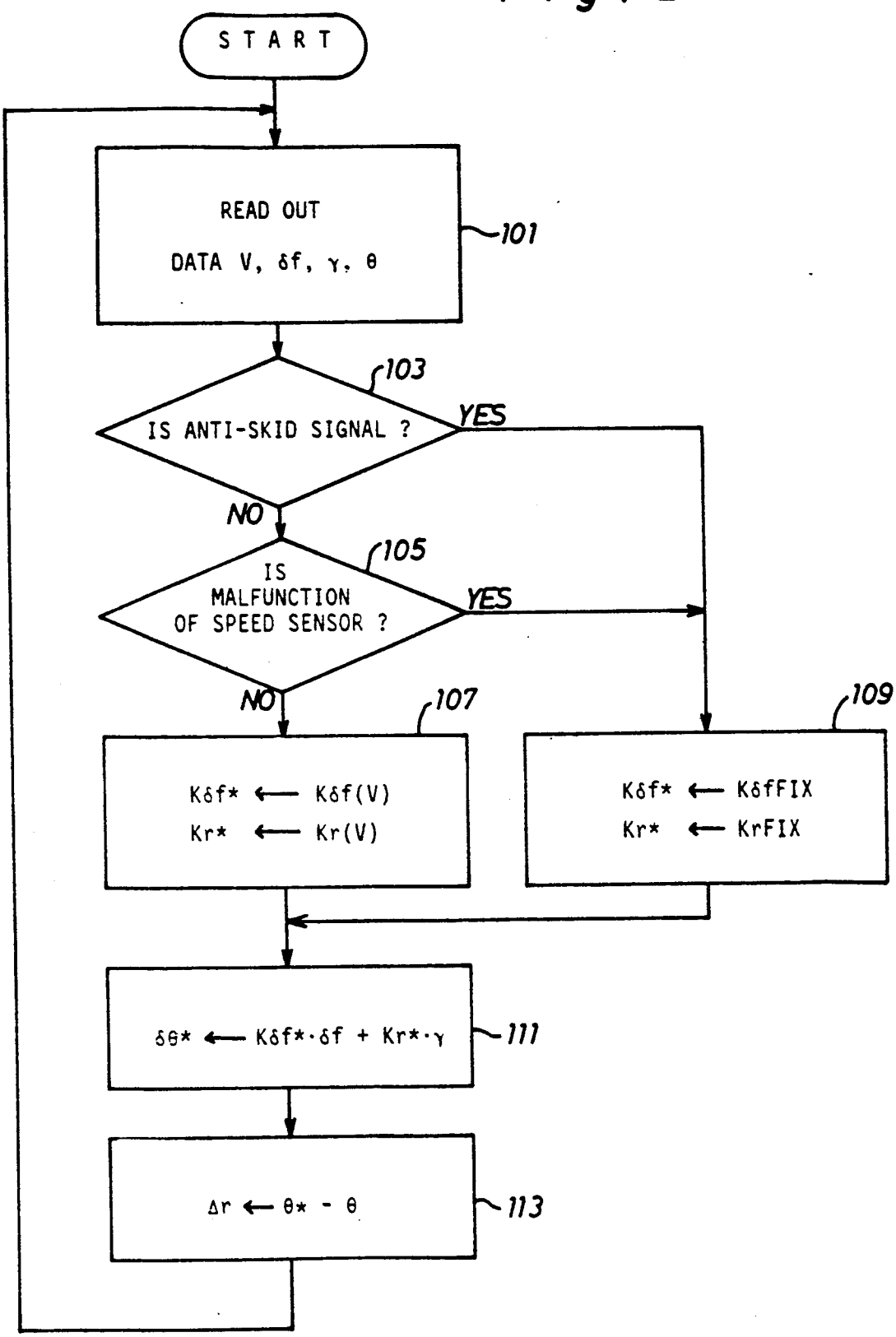
FIG. 2 is a flow chart illustrating a control program executed by a microcomputer shown in FIG. 1.
Figure 3:
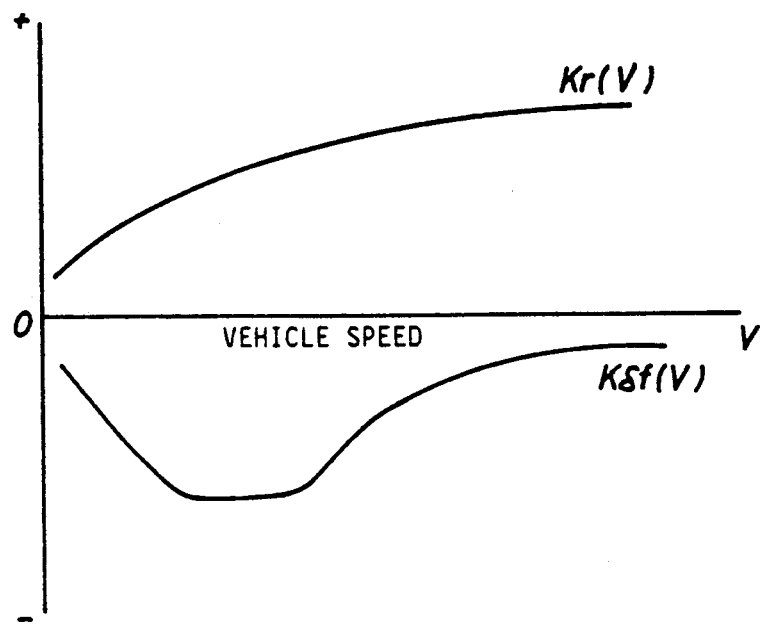
FIG. 3 is a graph showing coefficients of a front wheel steering angle and a yawrate in relation to the vehicle speed.
Figure 4:
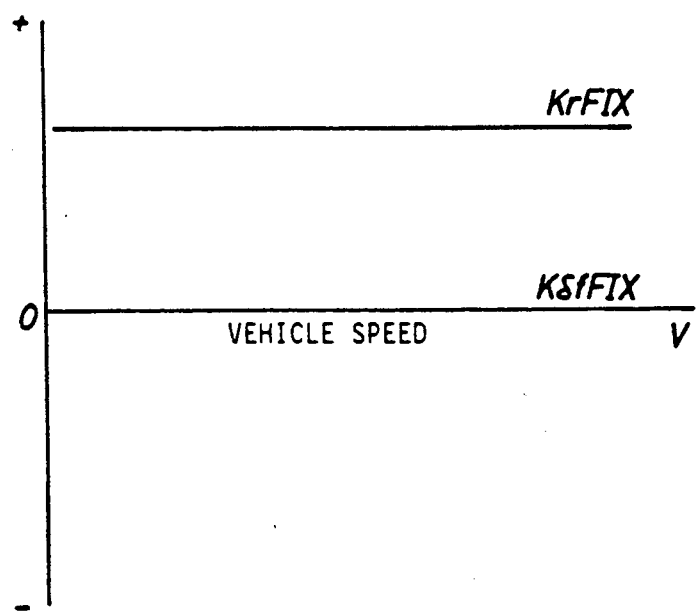
FIG. 4 is a graph showing fixed coefficients of the front wheel steering angle and the yawrate.

The microcomputer 65 further includes a read-only memory or ROM 65b, a central processing unit or CPU 65c and a random access memory or RAM 65d which are connected to one another and to I/O 65e by means of a bus line 65a. ROM 65b is arranged to memorize a control program illustrated by a flow chart in FIG. 2, and CPU 65c is arranged to execute the control program in a condition where an ignition switch (not shown) of the prime mover 21 is maintained in a closed position. ROM 65b is arranged to further memorize a coefficient $K\delta f(V)$ of the front wheel steering angle related to the vehicle speed V and a coefficient $K\gamma(V)$ of the yawrate related to the vehicle speed V in the form of a table and to memorize a fixed coefficient $K\delta fFIX$ of the front wheel steering angle and a fixed coefficient $K\gamma FIX$ of the yawrate. The coefficients $K\delta f(V)$ and $K\gamma(V)$ are read out by CPU 65c from ROM 65b in dependence upon the electric signal indicative of the vehicle speed V applied thereto. As shown in FIG. 3, the coefficient $K\delta f(V)$ is determined to be a negative value the absolute value of which increases in accordance with an increase of the vehicle speed V during low speed travel of the vehicle and decreases gradually in accordance with an increase of the vehicle speed V during medium and high speed travel of the vehicle, and the coefficient $K\gamma(V)$ is determined to be a positive value the absolute value of which increases gradually in accordance with an increase of the vehicle speed V. As shown in FIG. 4, the fixed coefficient $K\delta fFIX$ is determined to be "0", and the fixed coefficient $K\gamma FIX$ is determined to be a predetermined positive value.

RAM 65d is arranged to temporarily memorize variables necessary for execution of the control program.

I/O 65e is further connected to the electric control circuit 52 to be applied with the anti-skid signal therefrom. A driving circuit 66 is connected to I/O 65e to be applied with a control signal Δγ from CPU 65c therethrough. When applied with the control signal Δγ, the driving circuit 66 causes the step-motor 45 to rotate at an angle defined by the data of control signal Δγ and to retain in its rotated position.

Figure 6:
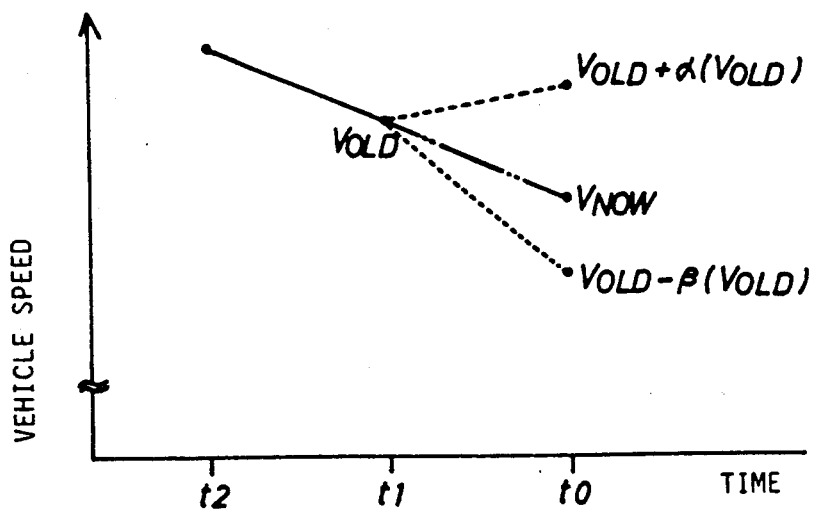
FIG. 6 is a graph showing a vehicle speed presumed at an anti-skid apparatus.

Assuming that the ignition switch of the prime mover 21 has been closed, CPU 65c initiates to execute the control program as described hereinafter. At step 101, CPU 65c is applied with the electric signals from sensors 61-64 through I/O 65e to read out the front wheel steering angle δf, vehicle speed V, yawrate γ and rotational angle θ to temporarily memorize them in RAM 65d. When the program proceeds to step 103, CPU 65c determines whether or not an anti-skid signal is being produced from the electric control circuit 52 of anti-skid apparatus C. In this instance, the computer of electric control circuit 52 acts to presume vehicle speeds VF1, VF2, VR1, VR2 at the road wheels based on each electric signal applied thereto from speed sensors 52a-52d. If the road wheels are free from locking at a time t0 in FIG. 6, the presumed vehicle speeds VF1, VF2, VR1, VR2 will be equal to an actual vehicle speed. If the road wheels tend to be locked, the presumed vehicle speeds will be lower than the actual vehicle speed. For this reason, a maximum speed $V_{MAX}$(VF1 to VR2) is selected from the presumed vehicle speeds VF1, VF2, VR1, VR2 for the following determination. Since deceleration and acceleration of the vehicle is actually conducted in a limited range, it is presumed that an instant vehicle speed $V_{NOW}$ at time t0 is in a range ($V_{OLD}+\alpha(V_{OLD})$) to $V_{OLD}-\beta(V_{OLD})$) based on the vehicle speed $V_{OLD}$ at time t1. Thus, as shown in FIG. 6, the instant vehicle speed $V_{NOW}$ is presumed as a medium speed among ($V_{OLD}+\alpha(V_{OLD})$), $V_{MAX}$(VF1 to VR2), and $V_{OLD}-\beta(V_{OLD})$. If either one of the presumed vehicle speeds VF1 to VR2 is greatly different from the instant vehicle speed $V_{NOW}$, CPU 65c is applied with an anti-skid signal from the electric control circuit 52 of anti-skid apparatus C. Under such a condition, the reliability of the vehicle speed V detected by speed sensor 62 will lower due to slippage of the road wheel.

When the answer at step 103 is "No", the program proceeds to step 105 where CPU 65c determines whether the speed sensor 62 is in a normal condition or not. If a difference between the vehicle speeds detected at times t1 and t0 is extraordinarily large, CPU 65c will determine a "Yes" answer at step 105 and cause the program to proceed to step 109. When the answer at step 105 is "No", the program proceeds to step 107 where CPU 65c sets a coefficient Kδf(V) of the front wheel steering angle and a coefficient Kγ(V) of the yawrate as parameter Kδf* and Kγ* used for calculation of a steering amount of the rear road wheels. If the answer at step 103 or 105 is "Yes", the program proceeds to step 109 where CPU 65c will set the fixed coefficient KδfFIX of the front wheel steering angle and the fixed coefficient KγFIX of the yawrate as parameter Kδf* and Kγ* used for calculation of a steering amount of the rear road wheels.

After the parameter Kδf* and Kγ* have been set at step 107 or 109, the program proceeds to step 111 where CPU 65c calculates a desired rotation angle δθ* of step-motor 45 on a basis of the following equation.

$$\delta\theta^* = K\delta f^* \cdot \delta f + K\gamma^* \cdot \gamma \quad (1)$$

Subsequently, the program proceeds to step 113 where CPU 65c calculates data Δγ for control of the rotational direction and angle of step-motor 45 based on the following equation.

$$\Delta\gamma = \theta^* - \theta \quad (2)$$

When applied with a control signal indicative of the data Δγ through I/O 65e, the driving circuit 66 is activated to rotate the step-motor 45. Thereafter, CPU 65c causes the program to proceed to step 101 to repeat the execution of the program described above.

Assuming that CPU 65c determines a "No" answer at step 103 and 105 during execution of the program, the coefficients Kδf(V) and Kγ(V) are set as the parameter Kδf* and Kγ* at step 107. During low speed travel of the vehicle, the coefficient Kδf(V) of the front wheel steering angle becomes a large negative value, while the coefficient Kγ(V) becomes a small positive value. (see FIG. 3) When the steering wheel 11 is turned rightward during such low speed travel of the vehicle, the front wheel steering angle δf and yawrate γ are detected respectively as a positive value. Thus, a desired rotation angle θ* of step-motor 45 is calculated as a negative value at step 111, and the control signal data Δγ is determined as a negative value at step 113 on a basis of the desired rotation angle δθ*. When applied with the control signal data Δγ, the driving circuit 66 causes the step-motor 45 to rotate at an angle defined by the negative control signal data Δγ in the reverse direction. In turn, the rack pin 44 is displaced leftward to cause leftward movement of the swingable lever 43. As a result, the valve sleeve 41a of valve assembly 41 is moved leftward to supply the hydraulic fluid under pressure into the left chamber 36b of power cylinder 36 and to permit the hydraulic fluid discharged from the right chamber 63c. This causes rightward movement of the power piston 36a. In this instance, the valve sleeve 41a is moved rightward in accordance with the rightward movement of power piston 36a to interrupt the supply of hydraulic fluid under pressure into the left chamber 36b of power cylinder 36 thereby to retain the power piston 36a in its displaced position. The rightward movement of power piston 36a causes the lateral rod 31 to displace rightward, and in turn, the knuckle arms 34a, 34b are rotated counterclockwisely through the tie rods 33a, 33b to steer the rear road wheels RW1, RW2 in the opposite direction relative to the front road wheels FW1, FW2. This is effective to enhance the maneuverability of the vehicle at the low speed travel.

When the steering wheel 11 is turned leftward during low speed travel of the vehicle, the front wheel steering angle δf and yawrate γ are detected respectively as a negative value. Thus, a desired rotation angle δθ* of step-motor 45 is calculated as a positive value at step 111, and the control signal data Δγ is determined as a positive value at step 113 on a basis of the desired rotation angle δθ*. When applied with the control signal data Δγ, the driving circuit 66 causes the step-motor 45 to rotate at an angle defined by the positive control signal data Δγ in the forward direction. In turn, the rack pin 44 is displaced rightward to cause rightward movement of the swingable lever 43. As a result, the valve sleeve 41a of valve assembly 41 is moved rightward to supply the hydraulic fluid under pressure into the right chamber 36c of power cylinder 36 and to permit the hydraulic fluid discharged from the left chamber 36b. This causes leftward movement of the power piston 36a. In this instance, the valve sleeve 41a is moved leftward in accordance with the leftward movement of power piston 36a to interrupt the supply of hydraulic fluid under pressure into the right chamber 36c of power cylinder 36 thereby to retain the power piston 36a in its displaced position. The leftward movement of power piston 36a causes the lateral rod 31 to displace leftward, and in turn, the knuckle arms 34a, 34b are rotated clockwisely through the tie rods 33a, 33b to steer the rear road wheels RW1, RW2 in the opposite direction relative to the front road wheels FW1, FW2. This is effective to enhance the maneuverability of the vehicle at the low speed travel.

When the vehicle speed increases, the absolute value of the coefficient Kδf(V) of the front wheel steering angle becomes small, while the absolute value of the coefficient Kγ(V) of the yawrate becomes large. When the steering wheel 11 is turned rightward during such high speed travel of the vehicle, the front wheel steering angle δf* and yawrate γ are detected respectively as a positive value. Thus, a desired rotation angle δθ* of step-motor 45 is calcualted as a positive value at step 111, the control signal data Δγ is determined as a positive value at step 113 on a basis of the desired rotation angle δθ*. When applied with the control signal Δγ, the driving circuit 66 causes the step-motor 45 to rotate at an angle defined by the positive control signal data Δγ in the forward direction. As a result, the rear road wheels RW1, RW2 are steered in the same direction as the front road wheels FW1, FW2. When the steering wheel 11 is turned leftward during high speed travel of the vehicle, the rear road wheels RW1, RW2 are steered in the same direction as the front road wheels FW1, FW2 substantially in the same manner as described above.

Assuming that the road wheels tend to be locked in braking operation, an anti-skid signal is produced from the electric control circuit 52 of anti-skid apparatus C. In such a condition, CPU 65c of computer 65 determines a "Yes" answer at step 103 and causes the program to proceed to step 109. Thus, the fixed coefficients KδfFIX and KγFIX are set as parameter Kδf* and Kγ* at step 109. When the sterring wheel 11 is turned rightward in such braking operation of the vehicle as described above, the yawrate γ becomes a positive value, and the desired rotation angle δθ* of step-motor 45 is determined as a positive value at step 111. As a result, the rear road wheels are steered in the same direction as the front road wheels during low and high speed travel of the vehicle. When the steering wheel 11 is turned leftward in the braking operation, the yawrate γ becomes a negative value, and the desired rotation angle δθ* of step-motor 45 is determined as a negative value at step 111. As a result, the rear road wheels are steered in the same direction as the front road wheels during low and high speed travel of the vehicle. Such control of the rear road wheels is effective to ensure maneuverability of the vehicle in braking operation during high speed travel.

From the above description, it will be understood that in a condition where the reliability of vehicle speed sensor 62 is maintained to be high, the coefficients Kδf(V) and Kγ(V) related to the vehicle speed are used to steer the rear road wheels in the opposite direction relative to the front road wheels during low speed travel of the vehicle and to steer the rear road wheels in the same direction as the front road wheels during high speed travel of the vehicle. In a condition where the reliability of vehicle speed sensor 62 becomes low, the fixed coefficients KδfFIX and KγFIX are used to steer the rear road wheels in the same direction as the front road wheels during low and high speed travel of the vehicle.

Although in the above embodiment the front steering angle δf and yawrate γ are detected to detect lateral deviation of the vehicle, lateral acceleration of the vehicle body may be detected.

What is claimed is:

1. A four-wheel steering system for an automotive vehicle having a front wheel steering mechanism operable in response to a steering effort applied thereto for steering a set of dirigible front road wheels and a rear wheel steering mechanism for steering a set of dirigible rear road wheels, said four-wheel steering system comprising:
   an electric control apparatus comprising:
      a speed sensor for detecting a travelling speed of the vehicle based on the rotational speed of at least one of the front road wheels and rear road wheels,
   means for detecting lateral deviation of the vehicle, computing means for:
      determining a parameter related to the detected vehicle speed,
      determining whether a difference between the vehicle speed detected by the speed sensor at a beginning of a predetermined time interval and the vehicle speed detected by the speed sensor at an end of the predetermined time interval is larger than a predetermined value,
      setting the parameter to a fixed value when the computing means determines that the difference is larger than the predetermined value,
      determining a first steering angle of the rear road wheels in accordance with the detected lateral deviation of the vehicle and the parameter related to the detected vehicle speed, and
      determining a second steering angle of the rear road wheels in accordance with the detected lateral deviation of the vehicle and the parameter set to the fixed value, and
   means for controlling said rear wheel steering mechanism to steer the rear road wheels independently of the front road wheels at the first determined steering angle when said parameter is related to the detected vehicle speed and to steer the rear road wheels in the same direction as the front road wheels at the second determined steering angle when said parameter is set to said fixed value.

2. A four-wheel steering system as in claim 1, said electric control apparatus further comprising means for determining whether at least one of the set of dirigible front road wheels and the set of dirigible rear road wheels are locked, the fixed value of the parameter being zero when at least one of the set of dirigible front road wheels and the set of dirigible rear road wheels are locked.

3. A four-wheel steering system as in claim 1, said means for detecting lateral deviation of the vehicle comprising a steering angle sensor for detecting a steering angle of the front road wheels and a yawrate sensor for detecting a yawing speed of the vehicle body.

4. A four-wheel steering system for an automotive vehicle having a front wheel steering mechanism operable in response to a steering effort applied thereto for steering a set of dirigible front road wheels and a rear wheel steering mechanism for steering a set of dirigible rear road wheels, said four-wheel steering system comprising:

an anti-skid apparatus for producing an anti-skid signal when at least one of the set of dirigible front road wheels and the set of dirigible rear road wheels are locked; and an electric control apparatus comprising:

a speed sensor for detecting a travelling speed of the vehicle based on the rotational speed of at least one of the front road wheels and rear road wheels, means for detecting lateral deviation of the vehicle caused by steerage of the front road wheels, computing means for:

determining a parameter related to the detected vehicle speed, detecting whether the anti-skid apparatus is producing the anti-skid signal, setting the parameter to a fixed value when the computing means detects that the anti-skid apparatus is producing the anti-skid signal, determining a first steering angle of the rear road wheels in accordance with the detected lateral deviation of the vehicle and the parameter related to the detected vehicle speed, and determining a second steering angle of the rear road wheels in accordance with the detected lateral deviation of the vehicle and the parameter set to the fixed value, and means for controlling said rear wheel steering mechanism to steer the rear road wheels independently of the front road wheels at the first determined steering angle when said parameter is related to the detected vehicle speed and to steer the rear road wheels in the same direction as the front road wheels at the second determined steering angle when said parameter is set to said fixed value.

5. A four-wheel steering system for an automotive vehicle having a front wheel steering mechanism operable in response to a steering effort applied thereto for steering a set of dirigible front road wheels and a rear wheel steering mechanism for steering a set of dirigible rear road wheels, said four-wheel steering system comprising:

an electric control apparatus comprising:

a speed sensor for detecting a travelling speed of the vehicle based on the rotational speed of at least one of the front road wheels and rear road wheels, means for detecting lateral deviation of the vehicle, computing means for:

determining a parameter related to the detected vehicle speed, determining whether a difference between the vehicle speed detected by the speed sensor at a beginning of a predetermined time interval and the vehicle speed detected by the speed sensor at an end of the predetermined time interval is larger than a predetermined value, setting the parameter to a fixed value when the computing means determines that the difference is larger than the predetermined value, determining a first steering angle of the rear road wheels in accordance with the detected lateral deviation of the vehicle and the parameter related to the detected vehicle speed when the difference is one of less than and equal to said predetermined value, and determining a second steering angle of the rear road wheels in accordance with the detected lateral deviation of the vehicle and the parameter set to the fixed value when the difference is larger than said predetermined value, and means for controlling said rear wheel steering mechanism to steer the rear road wheels independently of the front road wheels at the first steering angle when said difference is one of less than and equal to the predetermined value and to steer the rear road wheels in the same direction as the front road wheels at the second steering angle when said difference is larger than said predetermined value.

6. A four-wheel steering system for an automotive vehicle having a front wheel steering mechanism operable in response to a steering effort applied thereto for steering a set of dirigible front road wheels and a rear wheel steering mechanism for steering a set of dirigible rear road wheels, said four-wheel steering system comprising:

an anti-skid apparatus for producing an anti-skid signal when at least one of the set of dirigible front road wheels and the set of dirigible rear road wheels are locked; and an electric control apparatus comprising:

a speed sensor for detecting a travelling speed of the vehicle based on the rotational speed of at least one of the front road wheels and rear road wheels, means for detecting lateral deviation of the vehicle caused by steerage of the front road wheels, computing means for:

determining a parameter related to the detected vehicle speed, detecting whether the anti-skid apparatus is producing the anti-skid signal, setting the parameter to a fixed value when the computing means detects that the anti-skid apparatus is producing the anti-skid signal, determining a first steering angle of the rear road wheels in accordance with the detected lateral deviation of the vehicle and the parameter related to the detected vehicle speed when the computing means detects that the anti-skid apparatus is not producing the anti-skid signal, and determining a second steering angle of the rear road wheels in accordance with the detected lateral deviation of the vehicle and the parameter set to the fixed value when the computing means detects that the anti-skid apparatus is producing the anti-skid signal, and means for controlling said rear wheel steering mechanism to steer the rear road wheels independently of the front road wheels at the first steering angle when said computing means detects that the anti-skid apparatus is not producing the anti-skid signal and to steer the rear road wheels in the same direction as the front road wheels at the second steering angle when said computing means detects that the anti-skid apparatus is producing the anti-skid signal.

\* \* \* \* \*